United States Patent
Okimura et al.

(10) Patent No.: US 12,344,140 B1
(45) Date of Patent: Jul. 1, 2025

(54) VEHICLE SEAT

(71) Applicant: TS TECH CO., LTD., Asaka (JP)

(72) Inventors: Atsushi Okimura, Tochigi (JP); Tatsumi Konno, Tochigi (JP); Wataru Nishii, Tochigi (JP); Yuji Nakano, Tochigi (JP); Hiroshi Izawa, Tochigi (JP); Hiromi Taniguchi, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 18/630,762

(22) Filed: Apr. 9, 2024

Related U.S. Application Data

(63) Continuation of application No. 18/181,363, filed on Mar. 9, 2023, now Pat. No. 11,987,157, which is a
(Continued)

(30) Foreign Application Priority Data

Jul. 1, 2015 (JP) .................................. 2015-132473
Jul. 1, 2015 (JP) .................................. 2015-132474

(51) Int. Cl.
| | |
|---|---|
| B60N 2/56 | (2006.01) |
| B60N 2/58 | (2006.01) |
| B60N 2/60 | (2006.01) |
| B60N 2/68 | (2006.01) |
| B60N 2/90 | (2018.01) |
| A47C 7/74 | (2006.01) |

(52) U.S. Cl.
CPC ............ *B60N 2/5657* (2013.01); *B60N 2/56* (2013.01); *B60N 2/58* (2013.01); *B60N 2/6009* (2013.01); *B60N 2/68* (2013.01); *B60N 2/682* (2013.01); *B60N 2/90* (2018.02); *A47C 7/744* (2013.01); *B60N 2/5621* (2013.01); *B60N 2/5642* (2013.01)

(58) Field of Classification Search
CPC .. B60N 2/5657; B60N 2/5651; B60N 2/5642; A47C 7/744
See application file for complete search history.

(56) References Cited

U.S. PATENT DOCUMENTS

| | | | |
|---|---|---|---|
| 6,048,024 | A | 4/2000 | Wallman et al. |
| 7,222,916 | B2 | 5/2007 | De Wilde et al. |
| (Continued) | | | |

FOREIGN PATENT DOCUMENTS

| | | |
|---|---|---|
| JP | 2007001509 | 1/2007 |
| JP | 2008246185 | 10/2008 |
| (Continued) | | |

OTHER PUBLICATIONS

Decision of Dismissal of Amendment issued for Japanese Patent Application No. 2022-101098, Dispatch date: May 28, 2024, 5 pages including English machine translation.
(Continued)

*Primary Examiner* — Syed A Islam
(74) *Attorney, Agent, or Firm* — HSML P.C.

(57) ABSTRACT

A vehicle seat according to the present invention includes: a seat back frame constituting a framework of a seat back; a blower disposed in the seat back; a bracket to which the blower is fixed; and a cover member provided on the rear side of the seat back frame. Herein, the bracket is fixed to the cover member with the seat back frame being held between the bracket and the cover member.

11 Claims, 16 Drawing Sheets

Related U.S. Application Data continuation of application No. 17/570,564, filed on Jan. 7, 2022, now Pat. No. 11,623,551, which is a continuation of application No. 16/716,045, filed on Dec. 16, 2019, now Pat. No. 11,241,985, which is a continuation of application No. 16/386,890, filed on Apr. 17, 2019, now Pat. No. 10,507,746, which is a continuation of application No. 15/562,589, filed as application No. PCT/JP2016/069027 on Jun. 27, 2016, now Pat. No. 10,293,720.

(56) References Cited

U.S. PATENT DOCUMENTS

| | | | |
|---|---|---|---|
| 7,261,372 B2 | 8/2007 | Aoki | |
| 7,275,984 B2 | 10/2007 | Aoki | |
| 7,419,209 B1 | 9/2008 | Mangiapane et al. | |
| 7,425,034 B2 | 9/2008 | Bajic et al. | |
| 7,607,739 B2 | 10/2009 | Browne et al. | |
| 7,963,595 B2 * | 6/2011 | Ito | B60N 2/5657 297/180.13 |
| 8,727,434 B2 | 5/2014 | Sahashi | |
| 8,752,892 B2 | 6/2014 | Sahashi | |
| 8,998,311 B2 | 4/2015 | Axakov et al. | |
| 9,073,466 B2 | 7/2015 | Ota | |
| 9,121,414 B2 | 9/2015 | Lofy et al. | |
| 9,694,716 B2 | 7/2017 | Masuda | |
| 9,783,088 B2 * | 10/2017 | Akaike | B60N 2/5657 |
| 10,293,720 B2 | 5/2019 | Okimura et al. | |
| 2006/0087160 A1 | 4/2006 | Dong et al. | |
| 2006/0290176 A1 | 12/2006 | Aoki | |
| 2007/0101729 A1 | 5/2007 | Aoki et al. | |
| 2007/0241592 A1 | 10/2007 | Griffin et al. | |
| 2009/0295200 A1 | 12/2009 | Ito et al. | |
| 2012/0256450 A1 | 10/2012 | Sahashi | |
| 2012/0256451 A1 | 10/2012 | Sahashi | |
| 2013/0300179 A1 | 11/2013 | Ota | |
| 2013/0328359 A1 | 12/2013 | Antonov et al. | |
| 2015/0061331 A1 | 3/2015 | Yang | |
| 2015/0274049 A1 | 10/2015 | Langensiepen et al. | |
| 2017/0282765 A1 | 10/2017 | Stroeters et al. | |
| 2018/0105083 A1 | 4/2018 | Tsuzaki et al. | |
| 2018/0111526 A1 | 4/2018 | Okimura et al. | |

FOREIGN PATENT DOCUMENTS

| | | |
|---|---|---|
| JP | 2009291310 | 12/2009 |
| JP | 2012218544 | 11/2012 |
| JP | 2012232731 A | 11/2012 |
| JP | 2013177027 | 9/2013 |
| JP | 2013233860 | 11/2013 |
| JP | 2015067172 A | 4/2015 |

OTHER PUBLICATIONS

International Search Report for PCT/JP2016/069027, dated Aug. 9, 2016, 4 pages including English translation.

Office Action issued for Japanese Patent Application No. 2020-126387, Dispatch Date: Nov. 30, 2021, 5 pages including English translation.

Notice of Reasons for Refusal issued for Japanese Patent Application No. 2022-101098, Dispatch Date: Jan. 4, 2024, 11 pages including English machine translation.

* cited by examiner

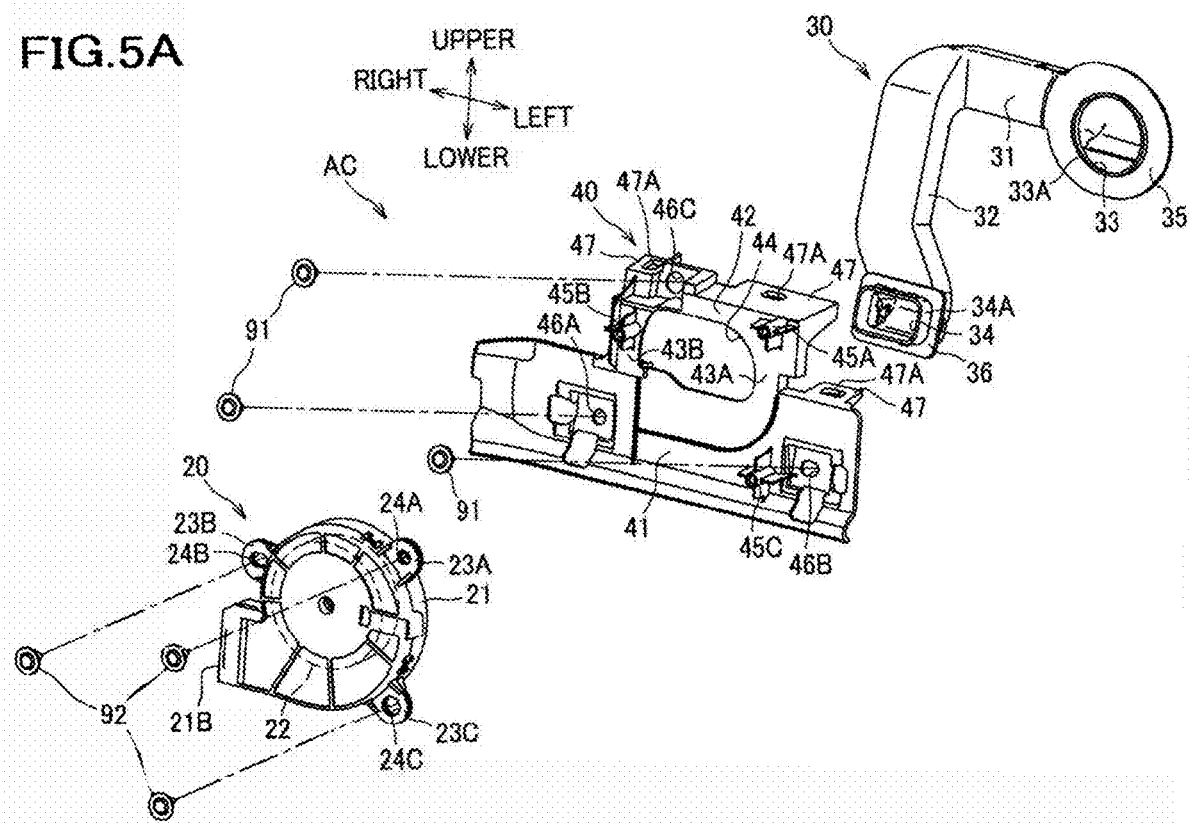

VEHICLE SEAT

TECHNICAL FIELD

The present invention relates to a vehicle seat having an air conditioning function using a blower.

BACKGROUND ART

Conventionally, there is known a car seat with an air conditioning function (PTL1); the car seat includes a blower provided in a seat back, and air on the surface of the seat back is forced to flow by the blower. According to the car seat disclosed in PTL1, the blower is fixed to a bridge frame bridging right and left side frames of the seat back frame. Further, a duct is fitted into an outlet of the blower; the duct is connected to an air flow passage formed in the seat back pad.

CITATION LIST

Patent Literature

PTL1: Japanese Laid-open Patent Application Publication No. 2013-233860

SUMMARY OF THE INVENTION

If the blower is directly fixed to a part of the seat back frame such as a bridge frame using bolts, it is necessary to prepare a separate dedicated part for fixing the blower, for example, nuts to be welded to the seat back frame. When there are two specifications of seats to be manufactured (i.e., seat with an air conditioner and seat without an air conditioner), a dedicated seat back frame for the seat with an air conditioner has to be prepared specifically for its purpose or unnecessary parts such as weld nuts have to be provided for the seat without an air conditioner so that the common seat back frame can be used for both specifications of seats.

In view of the above background of the prior art, it is an object of the present invention to provide a vehicle seat of which a blower can be fixed to the seat back frame with a simple structure.

It is also an object of the present invention to reduce the weight of the vehicle seat and to improve the degree of flexibility in designing the vehicle seat.

Further, it is an object of the present invention to minimize air leakage that would occur between the duct and the blower.

Further, it is an object of the present invention to ease assembly of the cover member and the bracket and to protect the duct connected to the blower.

Further, it is an object of the present invention to fix and protect a harness of the blower using a simple structure.

Further, it is an object of the present invention to easily assemble the blower in a proper position irrespective of manufacturing errors in dimensions of the blower.

The present invention proposed to attain one or more of the above objects provides a vehicle seat comprising: a seat back frame constituting a framework of a seat back; a blower disposed in the seat back; a bracket to which the blower is fixed; and a cover member provided on a rear side of the seat back frame. In this vehicle seat, the bracket is fixed to the cover member with the seat back frame being held between the bracket and the cover member.

With this configuration, using the cover member provided on the rear side of the seat back frame, the bracket to which the blower is fixed and the cover member sandwich the seat back frame, and the bracket is fixed to the cover member. Therefore, it is not necessary to provide weld nuts or the like required only for fixing the blower, so that fixing the blower to the seat back frame can be achieved with a simple structure. As a result, the same seat back frame can be easily rendered ready for common use to manufacture two specifications of seats, such as a seat with an air conditioner and a seat without an air conditioner.

In the above vehicle seat, the seat back frame may include: a pair of side frames laterally spaced apart from each other; an upper frame connecting upper end portions of the pair of side frames; a lower frame connecting lower end portions of the pair of side frames; and a bridge frame connecting the pair of side frames at an intermediate position between the upper frame and the lower frame. Herein, the bracket may be fixed to the cover member with the bridge frame being held between the bracket and the cover member.

In the above vehicle seat, the bracket may be made of plastic.

Weight reduction of the bracket can be achieved if the bracket is made of plastic. Further, since the contour of the bracket can be formed flexibly using plastic, the degree of flexibility in design can be improved.

The above vehicle seat may further comprise a duct connected to an inlet or an outlet of the blower. The duct may include a first opening disposed at one end and connected to the blower, a second opening disposed at another end, and a flange provided around the first opening, the blower may include a flat surface portion provided around the inlet or the outlet, and the flange may be disposed between the flat surface portion and the bracket, and the flange is held between the flat surface portion and the bracket by fixing the blower to the bracket.

With this configuration, the flange is held between the bracket and the flat surface portion of the blower, so that air leakage between the duct and the blower can be suppressed.

In the above vehicle seat, the cover member may have a shape of a cup that opens frontward. Further, in this configuration, the cover member may include a downwardly extending first claw portion at an upper portion of the cover member, the first claw portion being engageable with a front side of the seat back frame.

With this configuration, since the cover member can be temporarily assembled with the seat back frame by engaging the first claw portion with the front side of the upper portion of the seat back frame, the bracket can be fixed easily to the cover member.

Further, the cover member may include a downwardly extending second claw portion, the second claw portion being disposed rearward of and spaced apart from the first claw portion and configured to receive the seat back frame between the first claw portion and the second claw portion.

With this configuration, since the cover member is temporarily assembled with the seat back frame by inserting the seat back between the first claw portion and the second claw portion, the bracket can be fixed more easily to the cover member.

In the above vehicle seat, it is preferable that the cover member includes a rib protruding frontward and configured to contact the seat back frame from a rear side of the seat back frame.

With this configuration, the rigidity of the cover member is enhanced by the rib, so that the duct can be protected effectively. Further, when the cover member is temporarily assembled with the seat back frame, the rib can be brought into contact with the seat back frame from the rear side of the seat back frame to perform positioning of the cover member in the front-rear direction. Thus, assembly of the cover member is carried out with ease In the above vehicle seat, it is preferable that the cover member is provided with an engagement portion to which a harness of the blower is fixed.

With this configuration, the harness of the blower can be fixed to the cover member with ease, and the harness can be protected by the cover member.

In the above vehicle seat, the bracket may include a first boss, a second boss, and a third boss, which are engageable with the blower and with which fastening members for fixing the blower are fastened. In this case, the blower may include a circular first engagement hole to be fitted onto the first boss to position the blower, an elliptic second engagement hole to be engaged with the second boss to position the blower in a direction orthogonal to a longitudinal direction of the second engagement hole, and a third engagement hole to be engaged with the third boss with a play being present around the third boss With this configuration, the first boss is fitted into the first engagement hole whereby positioning of the blower relative to the bracket can be performed, and the second boss is engaged into the second engagement hole whereby the posture of the blower relative to the bracket can be determined. Further, the second engagement bole has an elliptic shape and the third boss is engageable with the third engagement hole with a play being present around the third boss, so that the blower can be assembled in a proper position even if the bosses of the blower are not precisely formed due to manufacturing error.

In the conventional car seat, the duct could not be fixed to an inlet or an outlet that is formed in a flat surface portion by simply fitting the duct into the inlet or the outlet. For this reason, a separate portion for fixing the duct, such as a claw portion, is required. Further, if the duct is simply engaged with the claw portion, it is difficult to control air leakage that would occur between the duct and the blower.

In view of the above background of the prior art, it is an object of the present invention to provide a vehicle seat of which a duct is fixed to an inlet or an outlet formed in a flat surface portion of a blower, while minimizing air leakage with a simple configuration.

The present invention proposed to attain the above object provides a vehicle seat comprising: a seat back frame constituting a framework of a seat back; a blower disposed in the seat back; a bracket to which the blower is fixed; and a duct connected to an inlet or an outlet of the blower. In this vehicle seat, the duct has a first opening provided at one side thereof to which the blower is connected, a second opening provided at another side of the blower, and a flange provided around the first opening, the blower includes a flat surface portion around the inlet or the outlet, and the flange is disposed between the flat surface portion and the bracket and held between the flat surface portion and the bracket when the blower is fixed to the bracket.

With this configuration, the flange can be brought into close contact with the flat surface portion because the flange is held between the bracket and the flat surface portion of the blower. Thus, the duct can be fixed easily to the inlet or the outlet formed in the flat surface portion of the blower without providing a dedicated structure to the blower, while preventing air leakage between the duct and the blower.

In the above vehicle seat, it is preferable that the duct has flexibility or elasticity. If the duct has flexibility or elasticity, the flange and the flat surface portion are brought into close contact in an improved manner to further prevent air leakage between the duct and the blower. In the above vehicle seat, it is preferable that the duct has a tubular portion at an edge of the first opening, the tubular portion being disposed in the inlet or the outlet.

With this configuration, the tubular portion is disposed in the inlet or the outlet to further prevent air leakage between the duct and the blower.

In the above vehicle seat, it is preferable that the tubular portion is spaced apart from a blade member of the blower by a predetermined distance.

This configuration can prevent interference between the tubular portion and the blade member of the blower.

In the above vehicle seat, it is preferable that the duct includes: a first portion connected to the blower and positioned at one side of the bracket; a second portion extending from the first portion and positioned at another side of the bracket; and a third portion extending from the second portion and positioned at the one side of the bracket.

With this configuration, when the duct is temporarily assembled with the bracket, the duct is prevented from coming off the bracket, and therefore the duct and the bracket can be assembled easily with the seat back frame.

In the above vehicle seat, it is preferable that the first opening and the second opening open in the same direction. In this configuration, the first opening and the second opening may be offset in an upper-lower direction. This can cause air to flow efficiently in a narrow space of the seat back with a compact configuration.

BRIEF DESCRIPTION OF DRAWINGS

FIG. 5A is an exploded perspective view of an air conditioner.

DESCRIPTION OF EMBODIMENTS

One embodiment of the present invention will be described in detail with reference made to the drawings, where necessary. In the following description, front/rear (frontward/rearward), right/left (lateral), and upper/lower (upward/downward or vertical) directions are designated as from the view point of an occupant seated on the car seat S.

Figure 1:
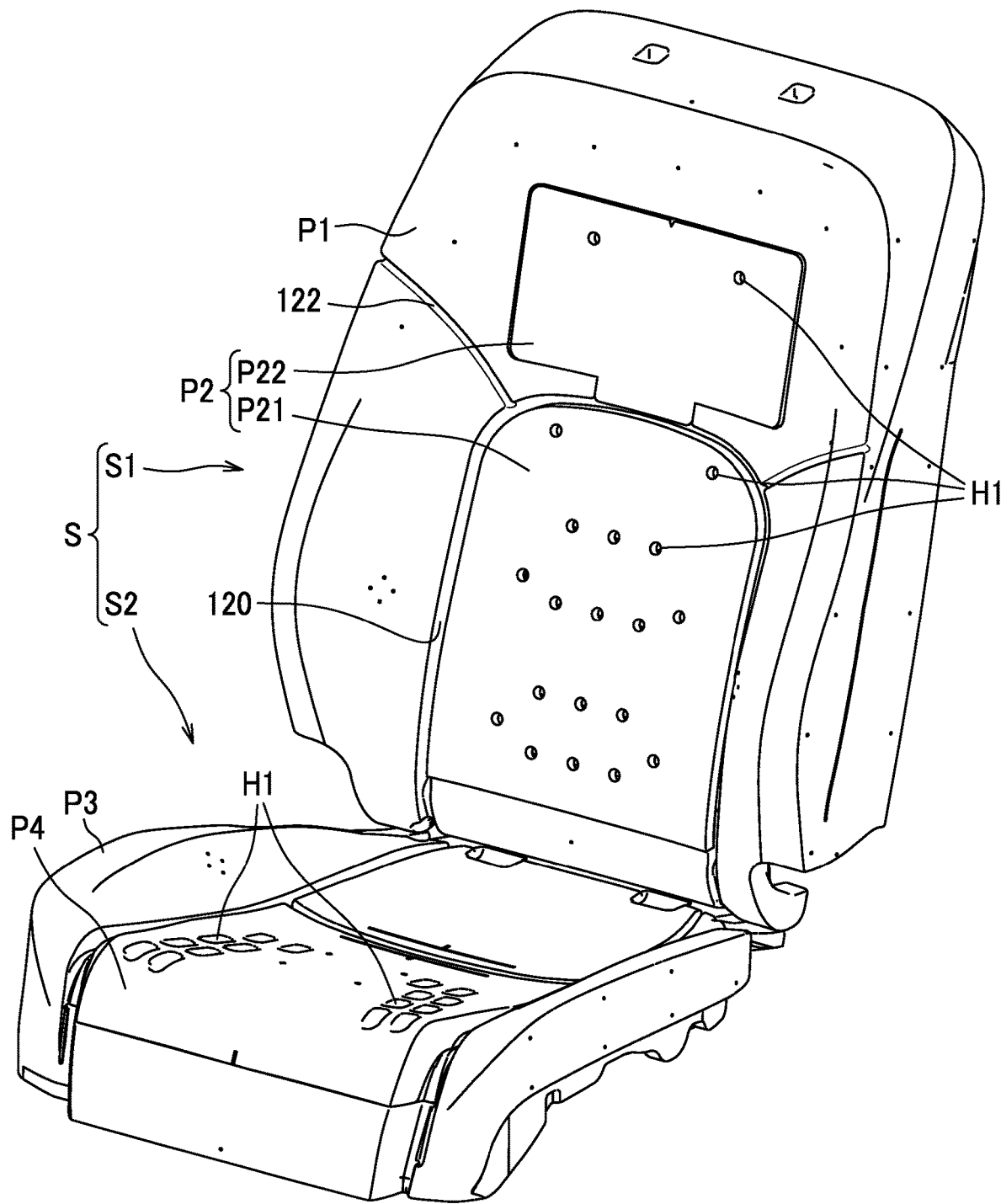
FIG. 1 is a perspective view of a car seat.

As seen in FIG. 1, a car seat S as an example of a vehicle seat is configured as a seat installed in a car and having an air conditioning function. The car seat S includes a seat back S1 and a seat cushion S2.

The seat back S1 includes a pad P1 and an upper layer pad P2 fitted into the pad P1.

The pad P1 is made of urethane foam or the like, and has a recess portion 100 (see FIG. 2) into which the upper layer pad P2 is fitted. The recess portion 100 is formed in the pad P1 and recessed rearward.

The upper layer pad P2 includes a first pad portion P21 and a second pad portion P22, each made of urethane foam or the like; the first pad portion P21 and the second pad portion P22 have ventilation holes H1, through which air is drawn in, at appropriate positions in the surfaces thereof. The upper layer pad P2 is flush with the surface of the pad P1 when it is fitted into the recess portion 100.

An inversed U-shaped tuck-in groove 120 is formed along an outer periphery of the recess portion 100 in positions corresponding to an upper end and right and left ends of the first pad portion P21; the tuck-in groove 120 is a groove that allows an outer skin material (not shown) to be tucked in, and the depth thereof is deeper than the recess portion 100. Further, provided at an upper end portion of the tuck-in groove 120 are a pair or right and left sewing-up portion arrangement grooves 122, in which sewing-up portions (not shown) of the outer skin material (not shown) are disposed; the sewing-up portion arrangement grooves 122 extend diagonally outward in the lateral direction from the upper end portion of the tuck-in groove 120. The sewing-up portion arrangement grooves 122 are formed as grooves shallower than the tuck-in groove 120.

Similarly, the seat cushion S2 includes a pad P3 and an upper layer pad P4 fitted into the pad P3. The upper layer pad P4 also has ventilation holes H1 at appropriate positions in the surfaces thereof. The upper layer pad P4 is flush with the surface of the pad P3 when it is fitted into the pad P3.

It should be noted that the outer skin material is not illustrated in FIG. 1, and that the car seat S includes the pad P1 and the upper layer pad P2 of the seat back S1, the pad P3 and the upper layer pad P4 of the seat cushion S2, and the outer skin material having air permeability that covers the seat back S1 and the seat cushion S2, respectively.

Figure 2:
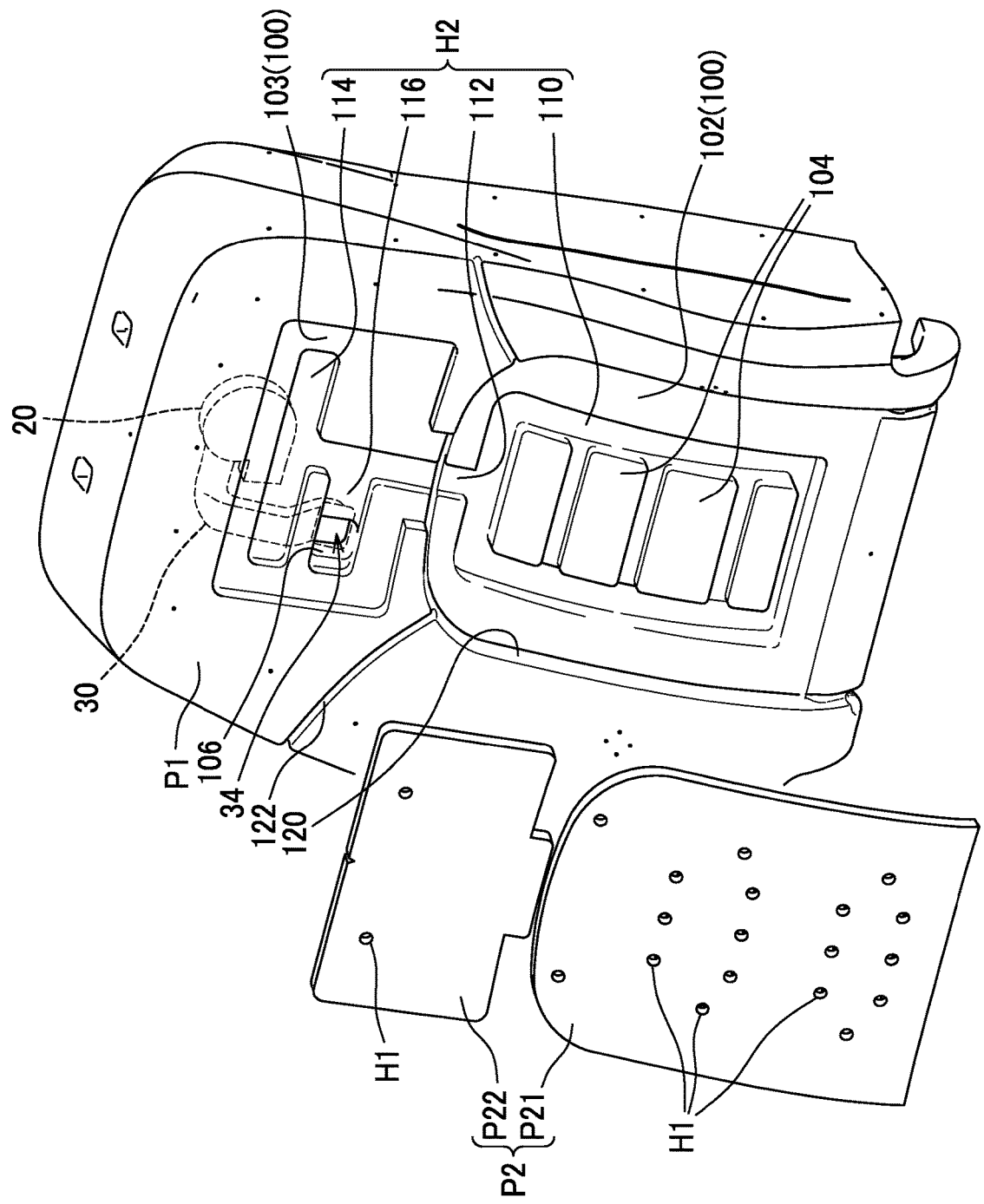
FIG. 2 is a perspective view illustrating a seat back pad of the car seat of FIG. 1, from which an upper layer pad is disassembled.

As seen in FIG. 2, in which the upper layer pad P2 has been removed, an air flow passage H2 is formed in the surface of the pad P1; air drawn in through the ventilation holes H1 flows through the air flow passage H2 to a duct 30 which will be described later.

To be more specific, the recess portion 100 includes a first recess portion 102 provided in a position corresponding to the first pad portion P21, and a second recess portion 103 provided in a position corresponding to the second pad portion P22. The first recess portion 102 and the second recess portion 130 communicate with each other.

The first recess portion 102 extends in an upper-lower direction from a central portion to a lower portion of the pad P1. A ladder-shaped groove 110 extending in the upper-lower direction and a lateral direction is formed within the first recess portion 102, and four protruding portions 104 are formed by this ladder-shaped groove 110. In the groove 110, grooves extending between the protruding portions 104 are shallower than grooves extending in the upper-lower direction.

Further, the first recess portion 102 has a vertical groove 112 formed to extend from an upper end of the groove 110 to an upper end of the first recess portion 102. The first recess portion 102 has a depth for supporting the first pad portion P21 from a rear side of the first pad portion P21.

The second recess portion 103 extends in the lateral direction at a position above the first recess portion 102. The second recess portion 103 has a through-opening 106 at a lower right portion thereof; the through-opening 106 communicates with a second opening 34 of the duct, which will be described later, and extends through the pad P1 in the front-rear direction (see FIG. 6). Further, a T-shaped groove 114 is formed within the second recess portion 103. The T-shaped groove 114 extends to a lower end of the second recess portion 103. Further, a transverse groove 116 extending in the lateral direction is formed within the second recess portion 103. The transverse groove 116 extends from the through-hole 106 to a vertical groove of the T-shaped groove 114. The second recess portion 103 has a depth for supporting the second pad portion P22 from a rear side of the second pad portion P22.

Together with the first pad portion P21 and the second pad portion P22 fixed to the first recess portion 102 and the second recess portion 103, the ladder-shaped groove 110 and the vertical groove 112 of the first recess portion 102 and the T-shaped groove 114 and the transverse groove 116 of the second recess portion 103 form the air flow passage H2. The first pad portion P21 and the second pad portion P22 are attached to the first recess portion 102 and the second recess portion 103 by adhesive, so that they are fixed to the pad P1.

The ventilation holes H1 of the first pad portion P21 and the second pad portion P22 are provided at positions corresponding to the air flow passage H2, so that air drawn in through the respective ventilation holes H1 flows to the second opening 34 of the duct 30 through the air flow passage H2.

Figure 3:
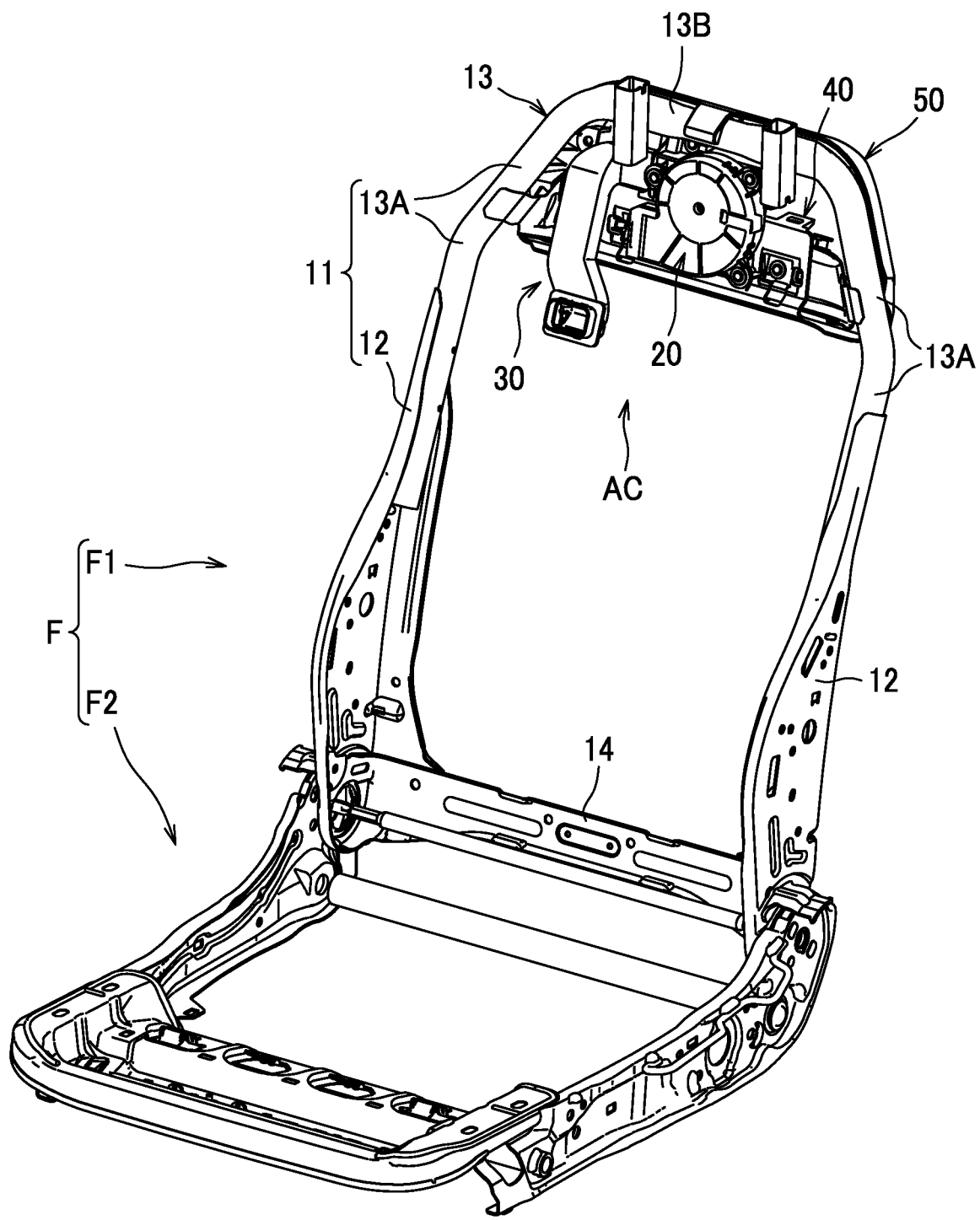
FIG. 3 is a perspective view of a seat frame.

As seen in FIG. 3, a seat frame F is embedded in the car seat S. The seat frame F includes a seat back frame F1 constituting a framework of the seat back S1, and a cushion frame F2 constituting a framework of the seat cushion S2. The following description will refer to the configuration of the seat back S1, and description for the seat cushion S2 will be omitted.

The seat back frame F1 includes a pair of sheet metal frames 12 made by press working sheet metal and, as parts, laterally spaced apart from each other, and a pipe frame 13 made by bending a pipe member into a U-shaped configuration and connected to respective upper ends of the pair of sheet metal frames 12.

The pipe frame 13 includes a pair of right and left upper side frames 13A each extending upward from the sheet metal frame 12 and then slightly slanted inward in the lateral direction. The right and left sheet metal frames 12 and the right and left upper side frames 13A constitute a pair of side frames 11 laterally spaced apart from each other. Further, the pipe frame 13 includes an upper frame 13B connecting upper end portions of the pair of upper side frames 13A, namely upper end portions of the side frames 11.

Further, the seat back frame F1 includes a lower frame 14 connecting lower end portions of the side frames 11.

An air conditioner AC is provided in the seat back S1. The air conditioner AC functions to draw air in around the surface of the seat back S1 through the ventilation holes H1 of the seat back S1, and thus implements an air conditioning function for the car seat S.

Figure 4:
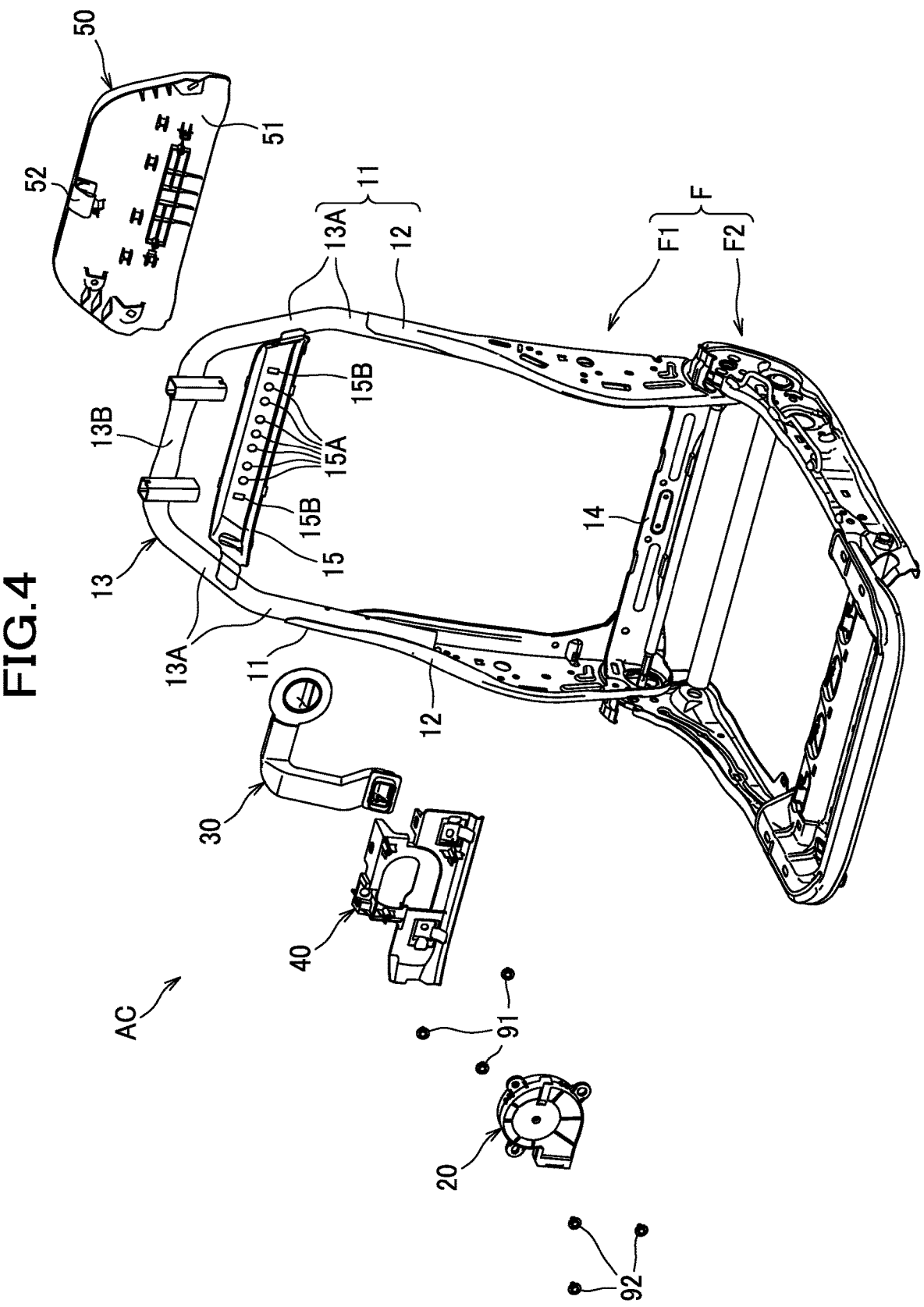
FIG. 4 is an exploded perspective view of the seat frame.

As seen in FIG. 4, the seat back frame F1 includes a bridge frame 15 to which the air conditioner AC is fixed. The bridge frame 15 connects the pair of side frames 11 at an intermediate position between the upper frame 13B and the lower frame 14.

The bridge frame 15 has a plurality of circular holes 15A arranged side by side, and a rectangular engagement hole 15B disposed rightward of and leftward of the plurality of circular holes 15A. Two circular holes 15A among the plurality of circular holes 15A are used as portions into which tapping bolts 91 for fixing a bracket 40 (to be described later) are inserted. The engagement holes 15B are formed such that hooks 56 of a cover member 50 (to be described later) are engageable therewith.

The air conditioner AC includes a blower 20, a duct 30 connected to the blower 20, a bracket 40 to which the blower 20 is fixed, and a cover member 50 provided on a rear side of the seat back frame F1 and configured to protect the air conditioner AC, in particular, the duct 30, from the rear side. These members are assembled together as will be described later, and the bracket 40 is supported by the bridge frame 15 through the tapping bolts 91, so that the blower 20 is fixed to the bracket 40 by the tapping bolts 92 as an example of fastening members.

As seen in FIG. 5A, the blower 20 is a sirocco fan and includes a casing 21, a blade member 22 disposed in the casing 21, and a motor 26 (see FIG. 9) for rotating the blade member 22. It should be understood that the blower 20 is not limited to a sirocco fan and other types of fans such as a propeller fan and a turbo fan may be used instead, and that the rotational direction of the blower may be reversed so that the supply air and the intake air can be switched over.

As is well-known in the art, the casing 21 is formed such that an air flow passage provided outside the blade member 22 widens gradually, and at a lower right portion thereof where the air flow passage has the maximum width, the casing 21 has an outlet 21B that opens to the right. The casing 21 may be made of plastic such as PBT (polybutylene terephthalate).

Figure 5B:
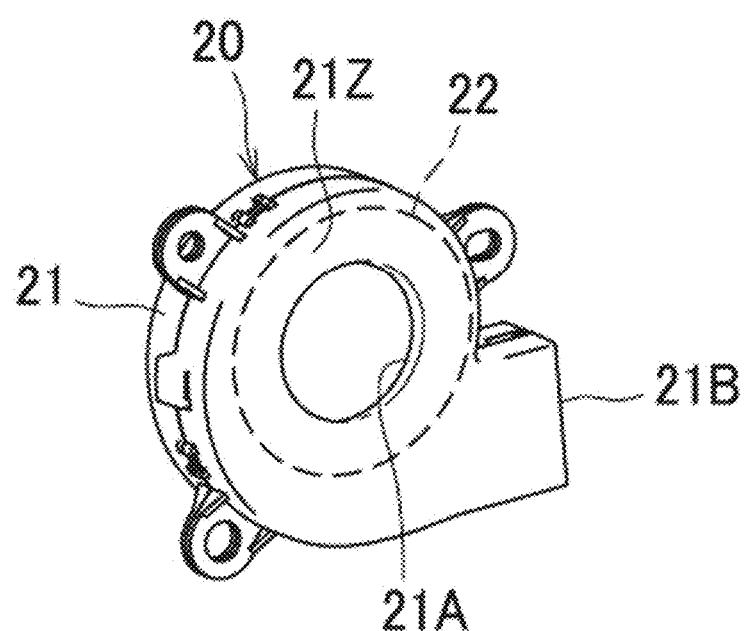
FIG. 5B is a perspective view showing a rear side of a blower.

As seen in FIG. 5B illustrating a rear side of the casing 21, the casing 21 has a circular inlet 21A at a center of the rear side. Further, the casing 21 has a flat surface portion 21Z around the inlet 21A; the flat surface portion 21Z faces rearward. Further, as seen in FIG. 5A, three attachment portions 23A, 23B, 23C provided to protrude outward are formed on an outer periphery of the casing 21. The attachment portion 23A protrudes to an upper left side of the casing 21, the attachment portion 23B protrudes to a generally right side of the casing 21, and the attachment portion 23C protrudes to a lower left side of the casing 21. A circular first engagement hole 24A is formed in the attachment portion 23A, a second engagement hole 24B in the shape of an elliptic hole extending in the right-left direction is formed in the attachment portion 23B, and a circular third engagement hole 24C having a size greater than that of the first engagement hole 24A is formed in the attachment portion 23C.

Figure 6:
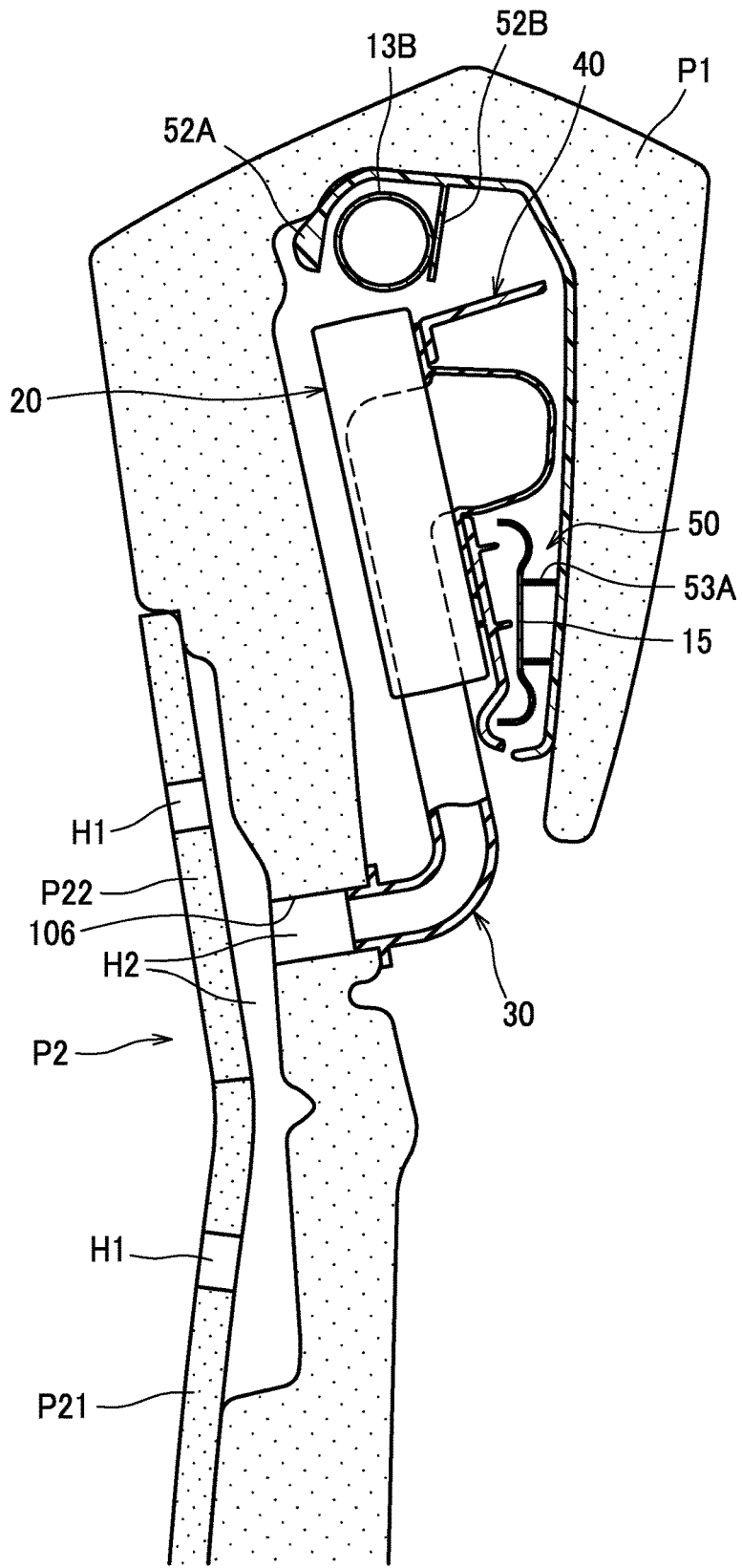
FIG. 6 is a vertical cross-section explaining how the blower, the duct, and the pad are connected.

As seen in FIG. 6, the duct 30 is a member connecting the blower 20 and the air flow passage H2 extending in the pad P1. The air flow passage H2 communicates with the ventilation holes H1.

Returning to FIG. 5A, the duct 30 includes a lateral extension portion 31 extending in the lateral direction and positioned on a rear side of the bracket 40, and a vertical extension portion 32 extending downward from a right end of the lateral extension portion 31.

The duct 30 has a circular first opening 33 disposed at a left end of the lateral extension portion 31 (i.e., one end of the duct 30), and a flange 35 provided around the first opening 33. The first opening 33 opens frontward, and the flange 35 extends in all directions around the first opening 33. The flange 35 is disposed in a position generally the same position as of a front surface of the lateral extension portion 31 in the front-rear direction. Further, a ridge portion 33A is formed around an edge of the first opening 33. The ridge portion 33A is formed to have a size to be closely fitted into the inlet 21A of the blower 20. The ridge portion 33A is disposed radially inward of and away from the blade member 22 of the blower 20 by a predetermined distance. For this reason, interference of the ridge portion 33A with the blade member 22 of the blower 20 can be prevented.

The duct 30 has a rectangular second opening 34; the second opening 34 opens frontward and is provided at a lower end portion of the vertical extension portion 32 (i.e., another end of the duct 30), at which portion the vertical extension portion 32 is bent frontward (see FIG. 6). The duct 30 further includes a flange 36 around the second opening 34; the flange 36 extends in all directions around the second opening 34. A tubular portion 34A protruding frontward is provided around an edge of the second opening 34. The duct 30 is made of a material having flexibility such as rubber or a material having elasticity such as a polyvinyl chloride sheet. For example, the duct 30 may be produced by a blow molding process of olefinic elastomer. However, the material for the duct 30 is not limited to this specific material, and any materials including plastics such as polyethylene, and composite materials such as fiber-reinforced plastics may be used irrespective of whether it has elasticity or not. If the first opening 33 is formed by cutting a part of a molded member that is produced by a blow molding process, the ridge portion 33A may be provided by leaving the uncut portion (i.e., burr) remaining in the vicinity of the first opening 33

The first opening 33 and the second opening 34 open in the same direction, that is, in the frontward direction, in this embodiment. Further, the first opening 33 and the second opening 34 are offset in the upper-lower direction and in the lateral direction. This makes it possible to cause air to flow efficiently in a narrow space of the seat back S1 with a compact arrangement of the duct 30.

The bracket 40 is produced, for example, by injection molding of plastic such as polypropylene. The bracket 40 includes a main body portion 41 extending in the right-left direction, an upper portion-support portion 42 disposed above the main body portion 41, a first connection portion 43A connecting the main body portion 41 and the upper portion-support portion 42 at a left end portion of the upper portion-support portion 42, and a second connection portion 43B connecting the main body portion 41 and the upper portion-support portion 42 at a right end portion of the upper portion-support portion 42. A through-opening 44 is provided in a space surrounded by the main body portion 41, the upper portion-support portion 42, the first connection portion 43A, and the second connection portion 43B.

A front surface of the upper portion-support portion 42, a front surface of the first connection portion 43A, and a front surface of the main body portion 41 provide a flush surface at a predetermined area including an area corresponding to the flange 35 of the duct 30. The second connection portion 43B is located frontward of this flush surface.

The bracket 40 includes a first boss 45A, a second boss 45B, and a third boss 45C; these first, second and third bosses 45A, 45B, 45C are provided to protrude frontward from the front surface of the bracket 40 and designed for the attachment of the blower 20. Each of the bosses 45A, 45B, 45C has a cylindrical tubular configuration, and a hole (shown without reference numeral) in which a tapping bolt 92 is engaged is formed in a front end surface thereof. The bosses 45A, 45B, 45C have the same configuration, and they are disposed in positions corresponding to the first engagement hole 24A, the second engagement hole 24B, and the third engagement hole 24C, respectively.

Further, the bracket 40 includes ribs (shown without reference numeral) connecting an outer peripheral surface of each of the bosses 45A, 45B, 45C and the front surface of the bracket 40. The ribs face frontward, and front surfaces of the ribs for the respective bosses 45A, 45B, 45C are neatly aligned in their front-rear positions, so that the position of the blower 20 in the front-rear direction can be determined when the blower 20 is brought into contact with the attachment portions 23A, 23B, 23C.

Further, the bracket 40 has a first fixing hole 46A formed in a right-side portion that is located on the right side of the center of the main body portion 41, a second fixing hole 46B formed in a left-side portion that is located on the left side of the center of the main body portion 41, and a third fixing hole 46C formed in a right end portion of the upper portion-support portion 42. The first, second, and third fixing holes 46A, 46B, 46C extend through the bracket 40 in the front-rear direction. The first, second, and third fixing holes 46A, 46B, 46C are portions into which tapping bolts 91 are inserted to fix the bracket 40 to the cover member 50. The first fixing hole 46A is a circular hole to be fitted onto a boss 54A (see FIG. 10) which will be described later, so that the positioning of the bracket 40 at the position of the first fixing hole 46A can be carried out. The second fixing hole 46B is an elliptic hole extending long in the right-left direction; when a boss 54B (see FIG. 10) which will be described later is engaged in the second fixing hole 46B, the positioning of the boss 54B is carried out in the upper-lower direction perpendicular to the longitudinal direction of the elliptic hole, so that the posture of the bracket 40 relative to the seat back frame F1 can be determined. The third fixing hole 46C is a circular hole having a diameter larger than that of the first fixing hole 46A, and is engaged with a boss 54C (see FIG. 10) which will be described later, with a play being present around the boss 54C.

Further, the bracket 40 includes extension portions 47 provided, for example, at an upper end portion of the main body portion 41 and at an upper end portion of the upper portion-support portion 42; the extension portions 47 extend rearward and have harness fixing holes 47A with which a harness of the blower 20 or a harness of other electrical equipment is fixed.

Figure 7:
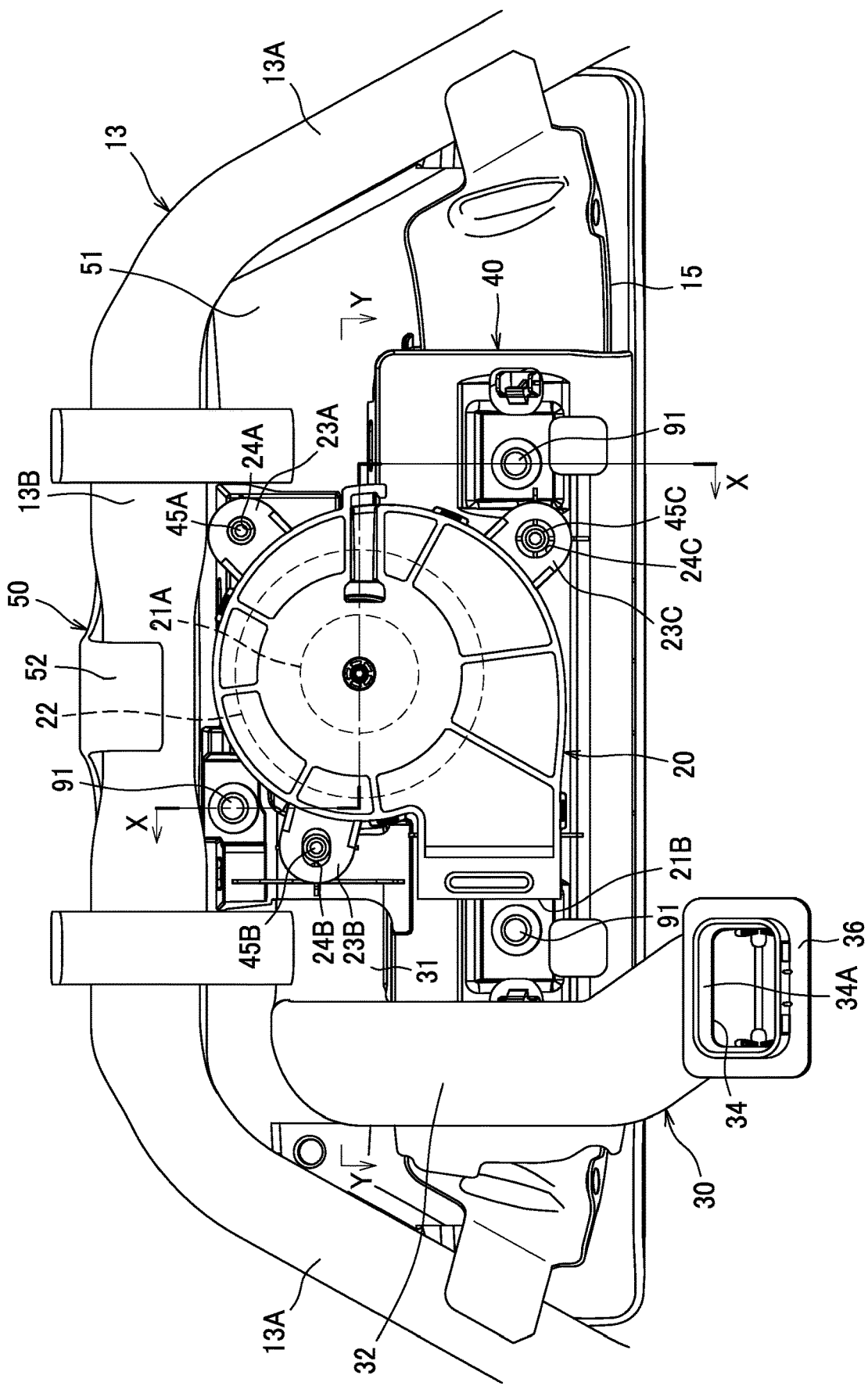
FIG. 7 is a front view illustrating the air conditioner assembled with the seat frame.

As seen in FIG. 7, the first engagement hole 24A is fitted onto the outer periphery of the first boss 45A so that the blower 20 can be positioned at the first engagement hole 24A in the front-rear direction and in the lateral direction. The second engagement hole 24B is engaged with the second boss 45B so that the blower 20 can be positioned in a direction perpendicular to the longitudinal direction of the second engagement hole 24B, that is, in the upper-lower direction, and the posture of the blower 20 can be determined. The third engagement hole 24C is larger than the first engagement hole 24A, so that the third engagement hole 24C can be engaged with the third boss 45C with a play being present around the third boss 45C. Accordingly, even if the bosses 45A, 45B, 45C of the blower 20 are not precisely formed due to manufacturing error, the blower 20 can be assembled in a proper position with ease.

Figure 8:
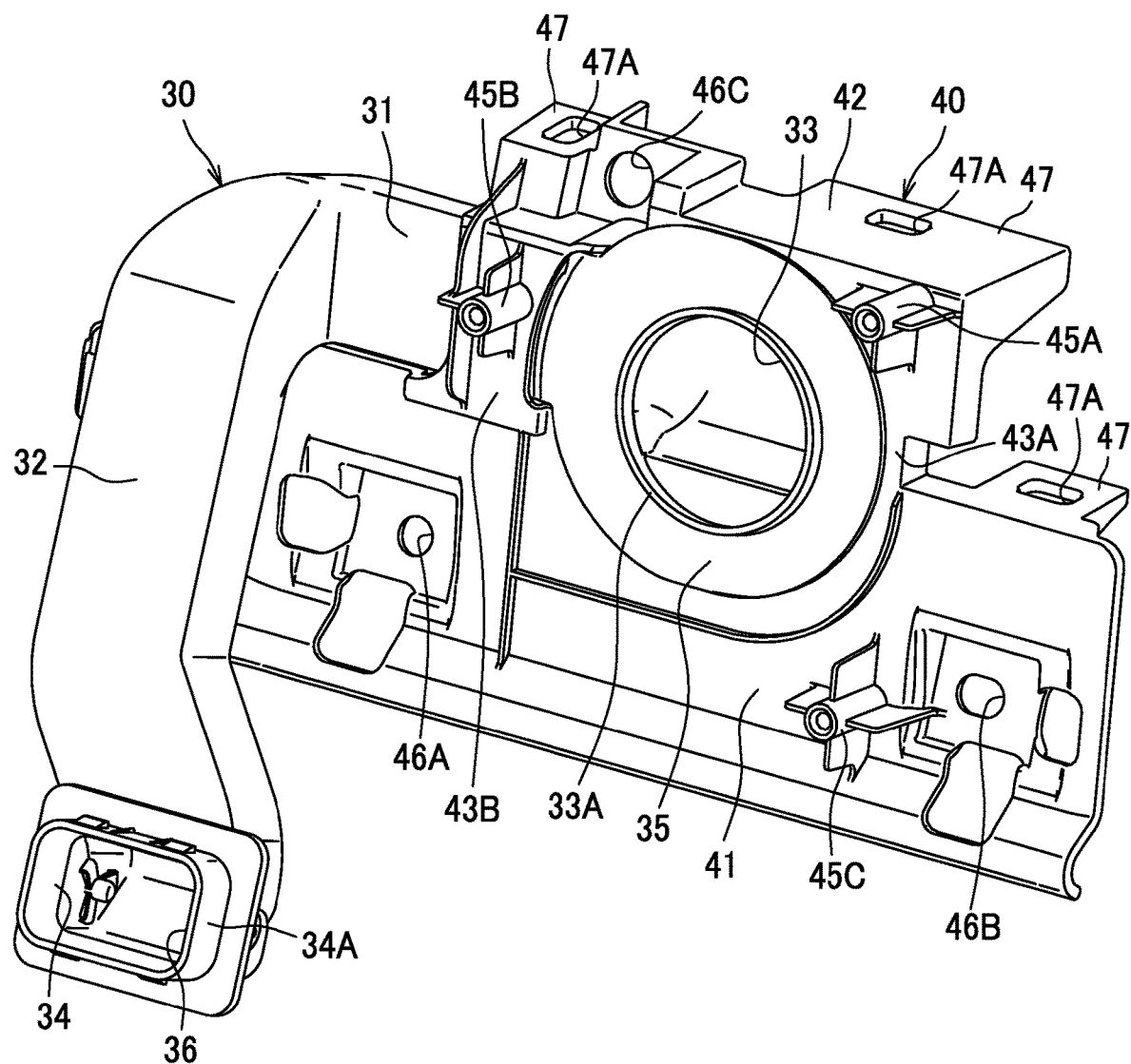
FIG. 8 is a perspective view illustrating the bracket and the duct that have been assembled temporarily.

To assemble the duct 30 shown in FIGS. 5A and SB with the bracket 40, the lower end portion of the vertical extension portion 32, that is, the second opening 34 side end portion of the vertical extension portion 32 is inserted into the through-hole 44 of the bracket 40 from the front side to the rear side of the bracket 40, followed by pulling the duct 35 until the flange 35 approaches the periphery of the through-hole 44, and making the vertical extension portion 32 to go around to the front side of the right-side portion of the bracket 40 as shown in FIG. 8. In this state, as shown in the sectional view of FIG. 9, the flange 35 is located on the front side (at one side) of a peripheral portion around the through-hole 44 of the bracket 40, and the lateral extension portion 31 extends out from the flange 35 and is located on the rear side (at another side) of the second connection portion 43B of the bracket 40, and the vertical extension portion 32 extends out from the lateral extension portion 31 and is located on the front side (at one side) of the bracket 40. In other words, the flange 35 is exemplified as an example of a first portion, the lateral extension portion 31 is exemplified as an example of a second portion, and the vertical extension portion 32 is exemplified as an example of a third portion.

As described above, the flange 35 is located on the front side of the bracket 40, the lateral extension portion 31 is located on the rear side of the bracket 40, and the vertical extension portion 32 is located on the front side of the bracket 40, so that when the duct 30 is temporarily assembled with the bracket 40, it is possible to prevent the duct 30 from coming off the bracket 40. Therefore, the duct 30 and the bracket 40 can be assembled easily with the seat back frame F1.

Figure 10:
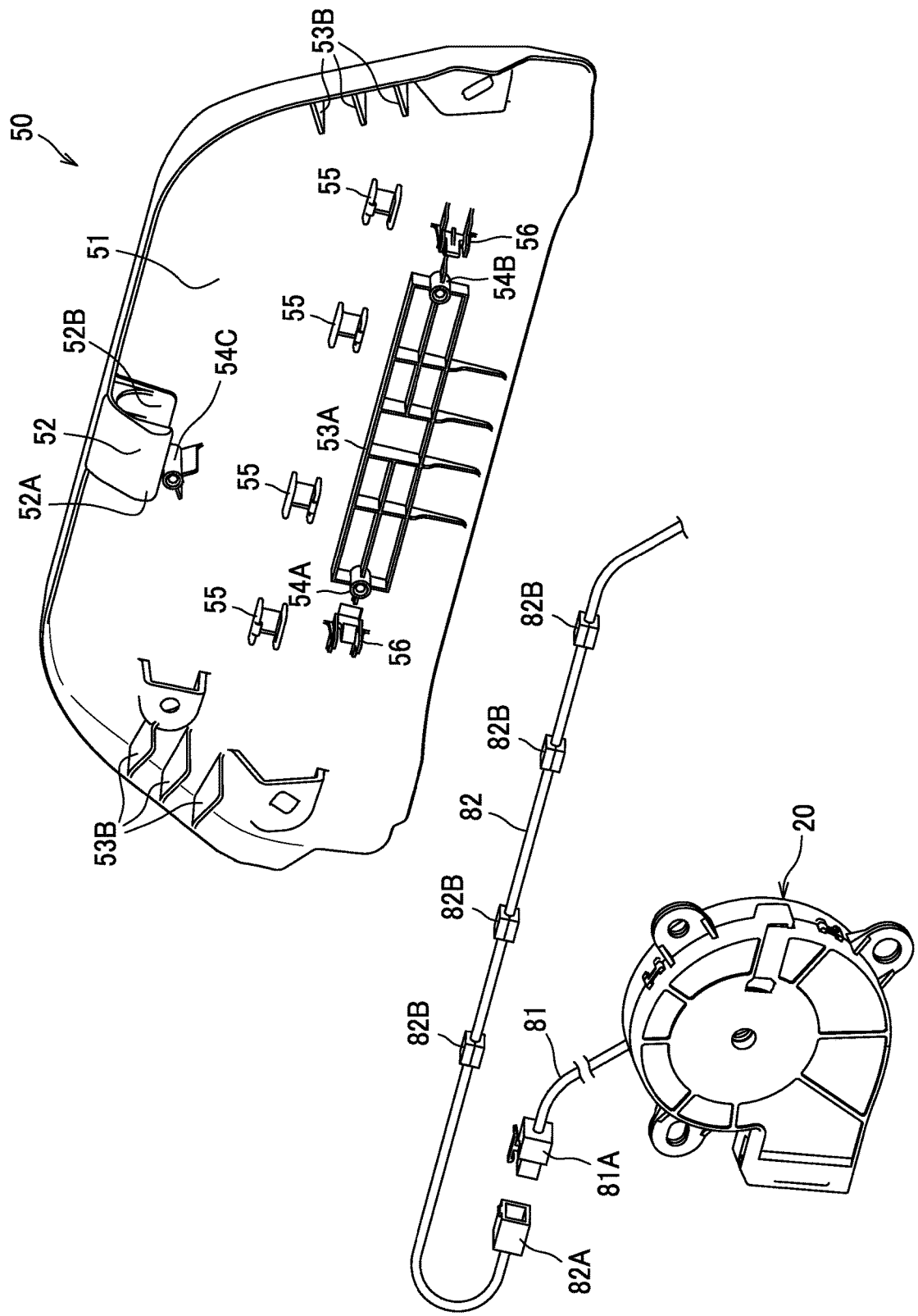
FIG. 10 is a perspective view illustrating the blower, a cover member, and a harness.

As seen in FIG. 10, the cover member 50 includes a main body portion 51, a locking claw portion 52 provided on a laterally central upper end portion of the main body portion 51, ribs 53A, 53B, bosses 54A, 54B, 54C, engagement portions 55 for fixing a harness, and hooks 56.

The main body portion 51 has right and left flange portions and an upper flange portion each extending frontward; accordingly, the main body portion 51 has a cup-shaped configuration that opens frontward.

The locking claw portion 52 includes a first claw portion 52A extending down from an upper end of the main body portion 51 at a front side of the main body portion 51, and a second claw portion 52B disposed on the rear side of and spaced apart from the first claw portion 52A and extending down from an upper end portion of the main body portion 51. The first claw portion 52A is disposed to be engageable with the front side of the upper frame 13B of the seat back frame F1. The second claw portion 52B is spaced apart from the first claw portion 52A by a distance corresponding to the thickness of the upper frame 13B, such that the seat back frame F1 can be received between the first claw portion 52A and the second claw portion 52B. With this configuration, the cover member 50 can be hooked on the upper frame 13B by inserting the upper frame 13B between the first claw portion 52A and the second claw portion 52B (see FIG. 6 and FIG. 11).

The ribs 53A are formed to protrude frontward from a lower portion of the front surface (inner surface) of the main body portion 51; the ribs 53A are disposed and sized to contact the bridge frame 15 of the seat back frame F1 from the rear side of the bride frame 15 (see FIG. 6).

Figure 11:
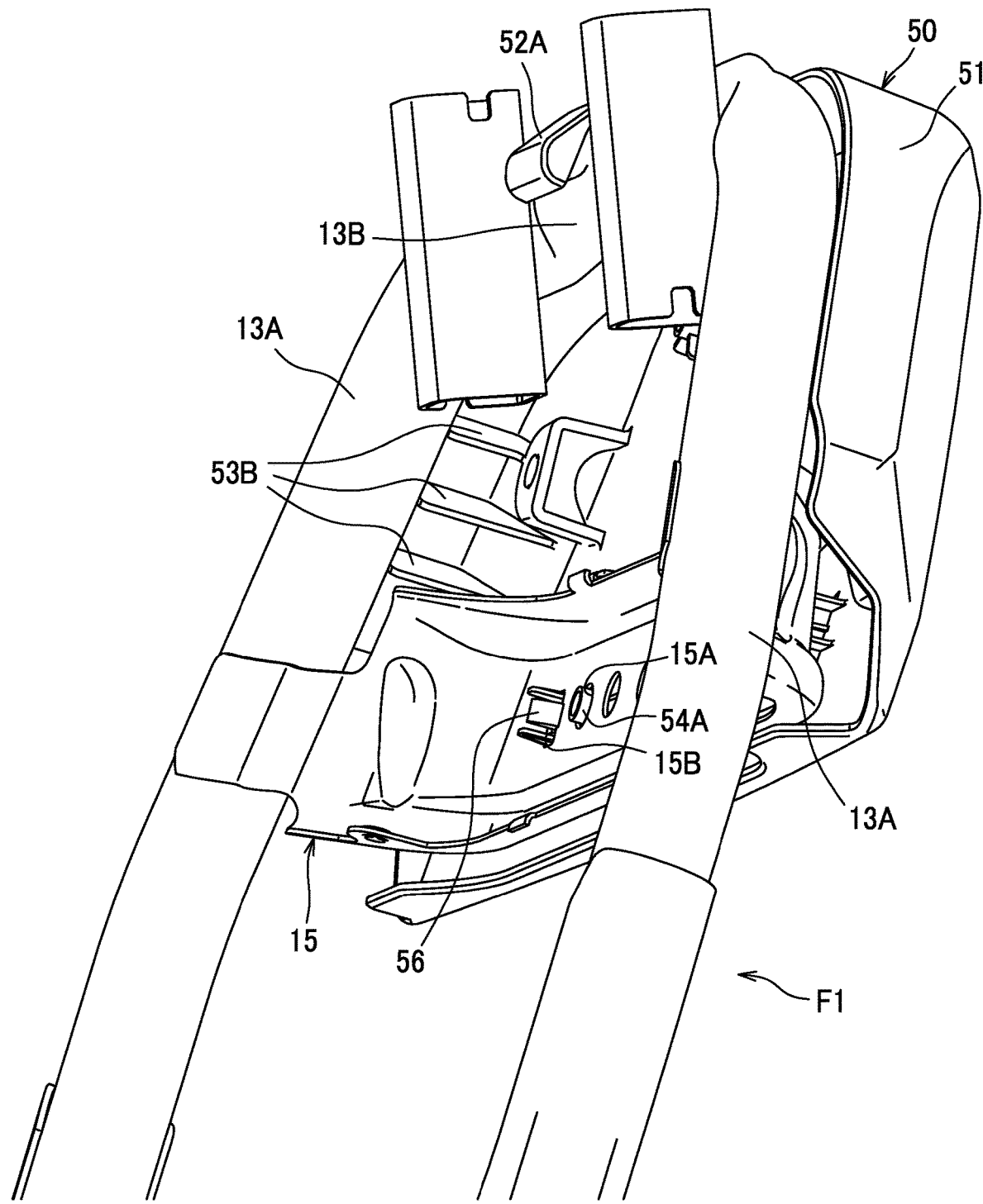
FIG. 11 is a diagram of the cover member assembled with the seat frame, as viewed from an obliquely frontward and downward direction.

The ribs 53B are provided on right and left end portions of the front surface of the main body portion 51 to protrude frontward. As seen in FIG. 11, the ribs 53B are disposed and sized to contact the upper side frames 13A of the seat back frame F1.

As seen in FIG. 10, each of the bosses 54A, 54B, 54C has a cylindrical configuration and extends from the inner surface of the main body portion 51. Each of the bosses 54A, 54B, 54C has a front end surface having a hole (shown without reference numeral) into which a tapping bolt 91 is inserted to fix the bracket 40 to the seat back frame F1. The bosses 54A, 54B, 54C have the same configuration, and they are disposed in positions corresponding to the first fixing hole 46A, the second fixing hole 46B, and the third fixing hole 46C of the bracket 40.

The cover member 50 includes ribs (shown without reference numeral) provided to connect the outer peripheral surface of each of the bosses 54A, 54B, 54C and the front surface of the main body portion 51. The boss 54A and the boss 54B are also connected to the ribs 53A.

Four engagement portions 55 are disposed generally on a vertical center portion of the front surface of the main body portion 51 and laterally spaced apart from each other. Each of the engagement portions 55 includes a pair of claw portions vertically spaced apart and protruding frontward, and an opening extends through the cover member 50 in the front-rear direction are provided between the pair of claw portions.

The hooks 56 protrude frontward from the front surface of the main body portion 51. The hooks 56 are flexible in the lateral direction and each have a claw portion (shown without reference numeral) protruding laterally inward.

The cover member 50 may be produced, for example, by injection molding of plastic such as polypropylene.

The harness for connecting the blower 20 to a controller (not shown) includes a first cable 81 extending out from the blower 20, and a second cable 82 connected to the first cable 81. The first cable 81 has an end to which a connector 81A is provided. The second cable 82 has an end to which a connector 82A connected to the connector 81A is provided, and four locking members 82B are fixed to intermediate positions of the second cable 82 with pitches corresponding to those of the engagement portions 55. The first cable 81 is pulled out to the right side from the blower 20, and the connector 81A is connected to the connector 82A. The second cable 82 extends to the right side from its connector 81A side end portion, and is then folded to make a 180-degree turn (U-shaped turn) and routed to the left side with the respective locking members 82B engaged with the corresponding engagement portions 55 (not shown). Further, a left end portion of the second cable 82 is routed to the lower side and connected to the controller (not shown).

Figure 12:
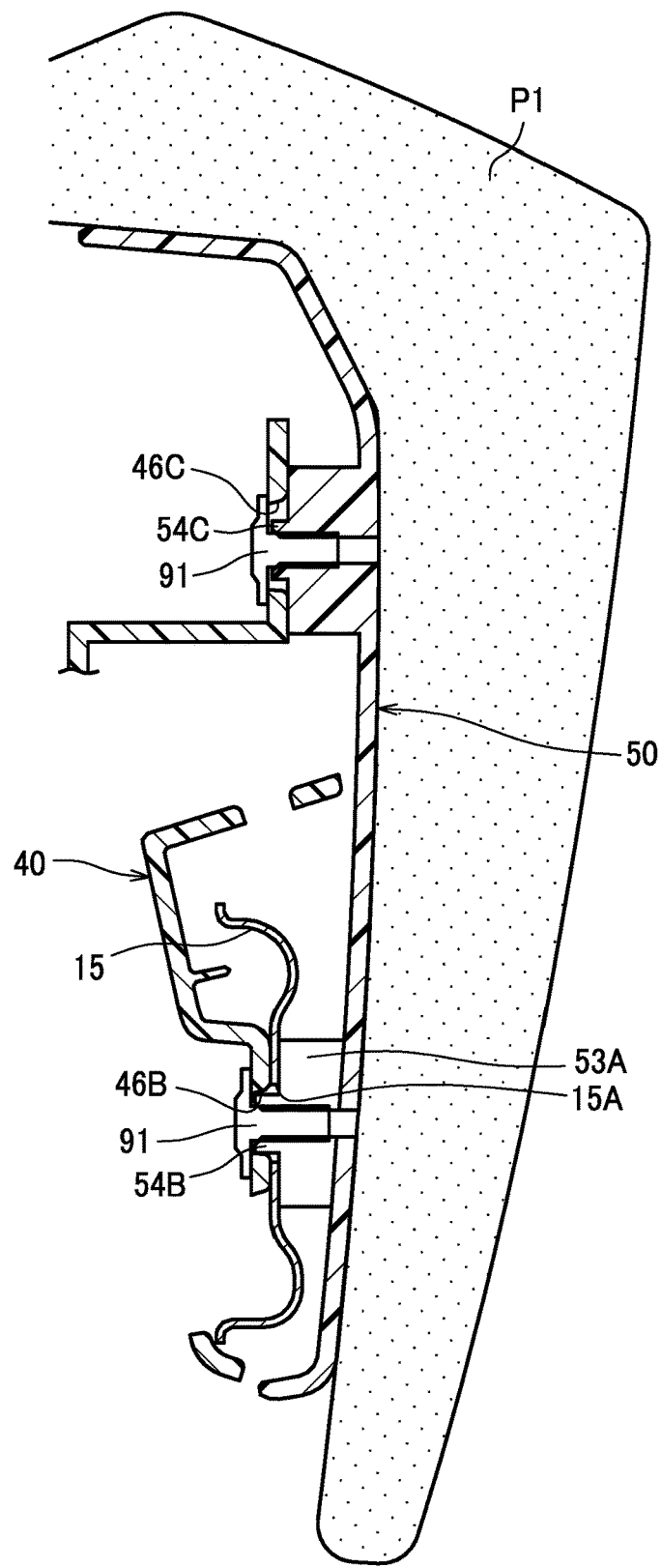
FIG. 12 is a partial section of the car seat taken along the line X-X of FIG. 6.

To assemble the bracket 40 with the seat back frame F1, the cover member 50 is hooked on the upper frame 13B by moving the upper frame 13B such that the upper frame 13B is received between the first claw portion 52A and the second claw portion 52B of the cover member 50. Next, the cover member 50 is pushed frontward, so that as seen in FIG. 11, the hooks 56 are inserted into and thus engaged with the engagement holes 15B. In this position, the ribs 53B are brought into contact with the upper side frames 13A, and as seen in FIG. 12, the ribs 53A are brought into contact with the bridge frame 15, so that the cover member 50 is positioned and temporarily assembled with the seat back frame F1. Thereafter, the bosses 54A, 54B are inserted into two circular holes 15A of the bridge frame 15. Further, the bracket 40 is fixed to the bridge frame 15 by inserting a tapping bolt 91 into the second fixing hole 46B and one circular hole 15A of the bridge frame 15 and screwing the taping bolt 91 into the hole of the boss 54B. Namely, the bracket 40 is fixed to the cover member 50 with the bridge frame 15 sandwiched and thus held between the bracket 40 and the cover member 50, so that the bracket 40 is fixed indirectly to the bridge frame 15 (i.e., seat back frame F1).

The bracket 40 is fixed to the boss 54A around the first fixing hole 46A by the same manner as shown in FIG. 12, in which the bracket 40 is fixed to the boss 54B around the second fixing hole 46B. Further, the bracket 40 is fixed to the boss 54C around the third fixing hole 46C by inserting a tapping bolt 91 into the third fixing hole 46C and screwing the tapping bolt 91 into the hole of the boss 54C. Accordingly, the bracket 40 is fixed to the cover member 50.

Figure 9:
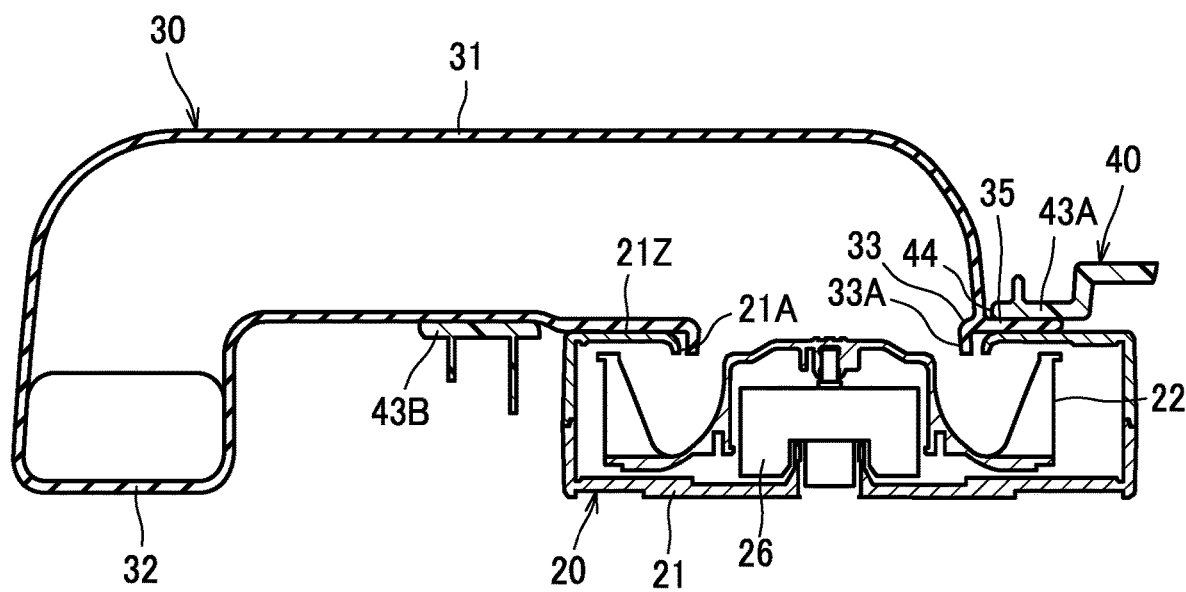
FIG. 9 is a sectional view of the blower, the duct, and the bracket taken along the line Y-Y of FIG. 6.

Next, to assemble the blower 20 with the bracket 40, the flat surface portion 21Z of the blower 20 is brought into close contact with the flange 35 as seen in FIG. 9. Then, while the flange 35 is held between blower 20 and the bracket 40, tapping bolts 92 are inserted into the first engagement hole 24A of the attachment portion 23A, the second engagement hole 24B of the attachment portion 23B, and the third engagement hole 24C of the attachment portion 23C, respectively, and the taping bolts 92 are screwed into the corresponding holes of the first boss 45A, the second boss 45B, and the third boss 45C. Accordingly, the flange 35 of the duct 30 is disposed between the flat surface portion 21Z and the bracket 40, and when the blower 20 is fixed to the bracket 40, the flange 35 of the duct 30 is held between the flat surface portion 21Z and the bracket 40.

According to the car seat S configured as described above, the following advantageous effects can be obtained.

Since the bracket 40 for securing the blower 20 is fixed to the cover member 50 with the bridge frame 15 of the seat back frame F1 being held between the bracket 40 and the cover member 50 provided on the rear side of the seat back frame F1, it is not necessary that dedicated parts for fixing the blower 20, such as nuts, be provided to the bridge frame 15. Accordingly, the blower 20 can be fixed to the seat back frame F1 with a simple structure. As a result, the same seat back frame F1 can be easily made ready for use to manufacture two specifications of seats, such as a seat with an air conditioner and a seat without an air conditioner.

Since the bracket 40 is made of plastic, weight reduction of the bracket 40 can be achieved. Further, since the contour of the bracket 40 can be shaped flexibly using plastic, the degree of flexibility in designing the bracket 40 can be improved.

Since the flange 35 is held between the bracket 40 and the flat surface portion 21Z of the blower 20, the flange 35 is brought into close contact with the flat surface portion 21Z, so that air leakage between the duct 30 and the blower 20 can be suppressed. With this configuration, the duct 30 can be fixed easily to the inlet 21A of the blower 20 without providing a dedicated structure to the blower 20. Further, since the duct 30 has elasticity, the degree of close contact between the flange 35 and the flat surface portion 21Z is improved, so that air leakage between the duct 30 and the blower 20 can be suppressed further.

Further, since the duct 30 includes the ridge portion 33A that is disposed in the inlet 21A, air leakage between the duct 30 and the blower 20 can be suppressed further.

Further, since the cover member 50 is temporarily assembled with the seat back frame F1 by engaging the first claw portion 52A with the upper frame 13B of the seat back frame F1, more specifically, with the seat back frame F1 being sandwiched between the first claw portion 52A and the second claw portion 52B, the bracket 40 can be fixed easily to the cover member 50.

Further, the rigidity of the cover member 50 is enhanced by the ribs 53A, 53B, so that the duct 30 can be protected effectively by the cover member 50. Further, when the cover member 50 is temporarily assembled with the seat back frame F1, the ribs 53A, 53B can be brought into contact with the seat back frame F1 from the rear side of the seat back frame F1 to perform the positioning of the cover member 50 in the front-rear direction. Accordingly, assembly of the cover member 50 is carried out with ease.

Further, the second cable 82 of the blower 20 can be fixed easily to the cover member 50 with the engagement portions 55 of the cover member 50, and the second cable 82 can be protected by the cover member 50. Accordingly, a malfunction such as breaking or electrical shorting of the second cable 82 can be suppressed, and the workability for assembling the second cable 82 can be improved as well.

Further, the first boss 45A is fitted into the first engagement hole 24A whereby positioning of the blower 20 relative to the bracket 40 can be performed, and the second boss 45B is engaged into the second engagement hole 24B whereby the posture of the blower 20 relative to the bracket 40 can be determined. Further, the second engagement hole 24B has an elliptic shape and the third boss 45C is engageable with the third engagement hole 24C with a play being present around the third boss 45C, so that the blower 20 can be assembled in a proper position even if the bosses 45A, 45B, 45C of the blower 20 are not precisely formed due to manufacturing error.

Although one preferred embodiment of the present invention has been described above, the present invention is not limited to the above-described embodiment. It is to be understood that various changes and modifications may be made to any of the specific configurations where necessary without departing from the gist of the present invention.

For example, the locking claw portion 52 is disposed on the upper end portion of the cover member 50. However, as long as the locking claw portion 52 is disposed above the center of gravity of the cover member 50, the locking claw portion 52 may be disposed at a position to some extent lower than the upper end portion. With this configuration, the cover member 50 can be hooked stably on the upper frame 13B. The second claw portion 52B is optional and may not be provided; however, providing the second claw portion 52B to be spaced apart from the first claw portion 52A by a distance corresponding to the thickness of the upper frame 13B makes it possible to position the cover member 50 generally in a proper position by simply hooking the locking claw portion 52 on the upper frame 13B.

In the above embodiment, the U-shaped bent pipe frame 13 is adopted to the upper end portion of the seat back frame F1. However, the seat back frame may be made by press working sheet metal.

Figure 13:
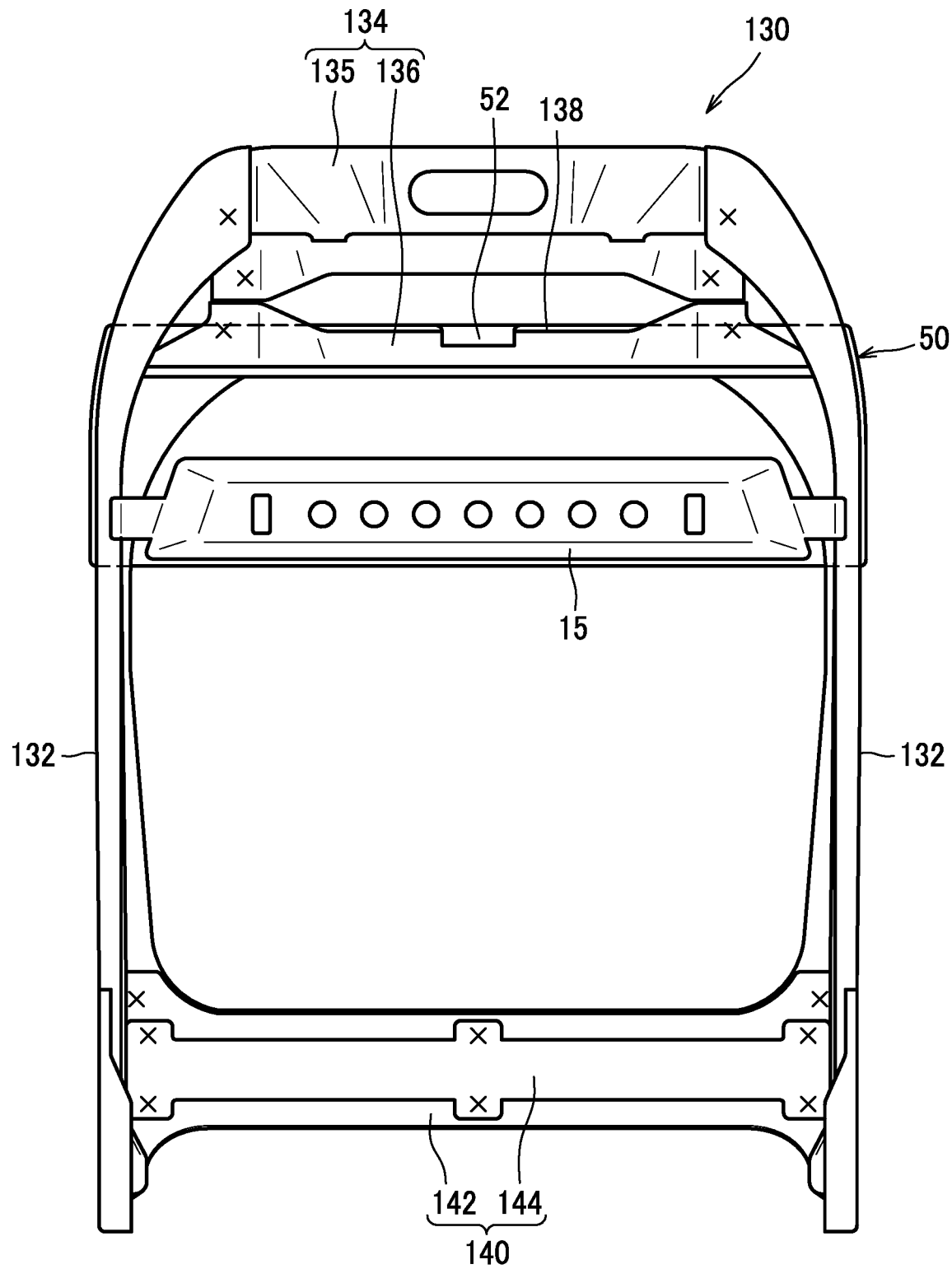
FIG. 13 is a sectional view of a seat back according to a modified embodiment.

To be more specific, as seen in FIG. 13, the seat back frame 130 includes a pair of right and left side frames 132 each having an upper portion bent inwardly in the lateral direction, an upper frame 134 connected to upper end portions of the pair of side frames 132, and a lower frame 140 connected to lower end portions of the pair of side frames 132.

The upper frame 134 includes an upper member 135 and a lower member 136 that are made respectively by press working. The upper member 135 are connected to the upper end portions of the pair of right and left side frames 132 by spot welding. The lower member 136 is located below the upper member 135 and connected to side surfaces of the pair of right left side frames 132 and to the upper member 135 by spot welding. Provided between the upper member 135 and the lower member 136 is an opening 138 through which the locking claw portion 52 of the cover member 50 is hooked on the lower member 136.

The lower frame 140 includes a main member 142 and an auxiliary member 144 that are made respectively by press working. The lower frame 140 is connected to lower end portions of the pair of right and left side frames 132 by spot welding.

In the seat back frame 130 configured as described above, the bridge frame 15 is disposed between the upper frame 134 and the lower frame 140.

As with the above-described embodiment, to assemble the blower 20, the duct 30, and the bracket 40 together, the cover member 50 is fixed to the bridge frame 15 with the locking claw portion 52 hooked on the lower member 136 through the opening 138, and the bracket 40 is fixed to the cover member 50 with the bridge frame 15 being sandwiched and held between the bracket 40 and the cover member 50. Further, the blower 20 and the duct 30 are fixed to the bracket 40, and the second opening 34 of the duct 30 is connected to the through-opening 106 formed in the second recess portion 103 of the pad P1.

Further, to reduce the weight of the bracket 40 according to this embodiment, the bracket 40 may optionally has lightening holes.

Figure 14:
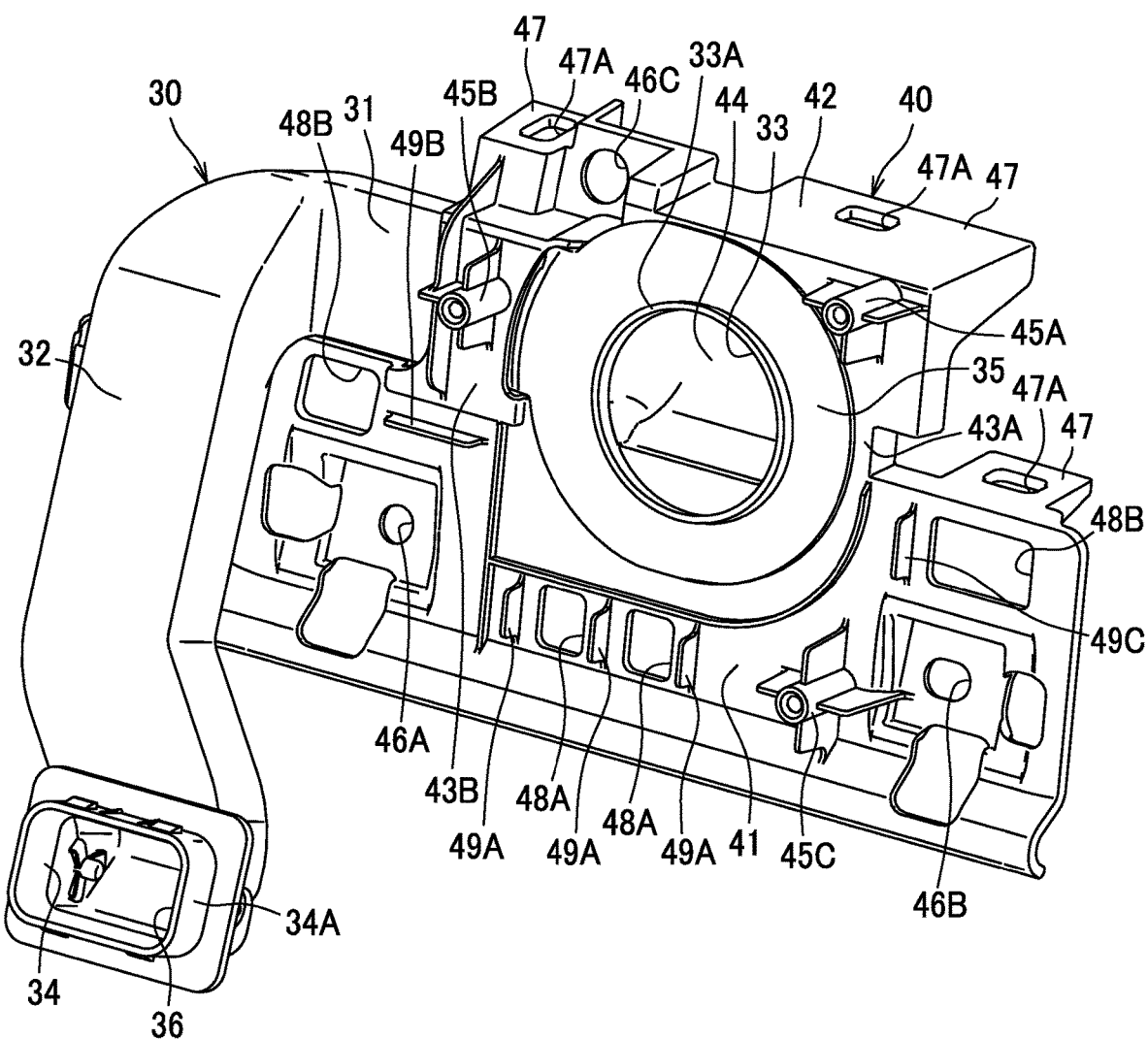
FIG. 14 is a sectional view of a bracket according to a modified embodiment.

For example, as seen in FIG. 14, the main body portion 41 of the bracket 40 has two openings 48A arranged side by side, at its central portion (below the through-opening 44). The main body portion 41 further has an opening 48B on each of right and left sides thereof (at positions above the first fixing hole 46A and the second fixing hole 46B).

Further, to compensate for the decrease in rigidity of the bracket 40 due to formation of the openings 48A, three reinforcement ribs 49A extending in the upper-lower direction are provided on the central portion of the main body portion 41, at positions between and outside of the two openings 48A. Similarly, to compensate for the decrease in rigidity of the bracket 40 due to formation of the openings 48B, the main body portion 41 includes at its right side a reinforcement rib 49B provided in proximity to the opening 48B and extending in the right-left direction, and at its left side a reinforcement rib 49C provided in proximity to the opening 48B and extending in the upper-lower direction.

Similarly, to reduce the weight of the cover member 50 according to the above-described embodiment, the cover member 50 may optionally have lightening holes.

Figure 15:
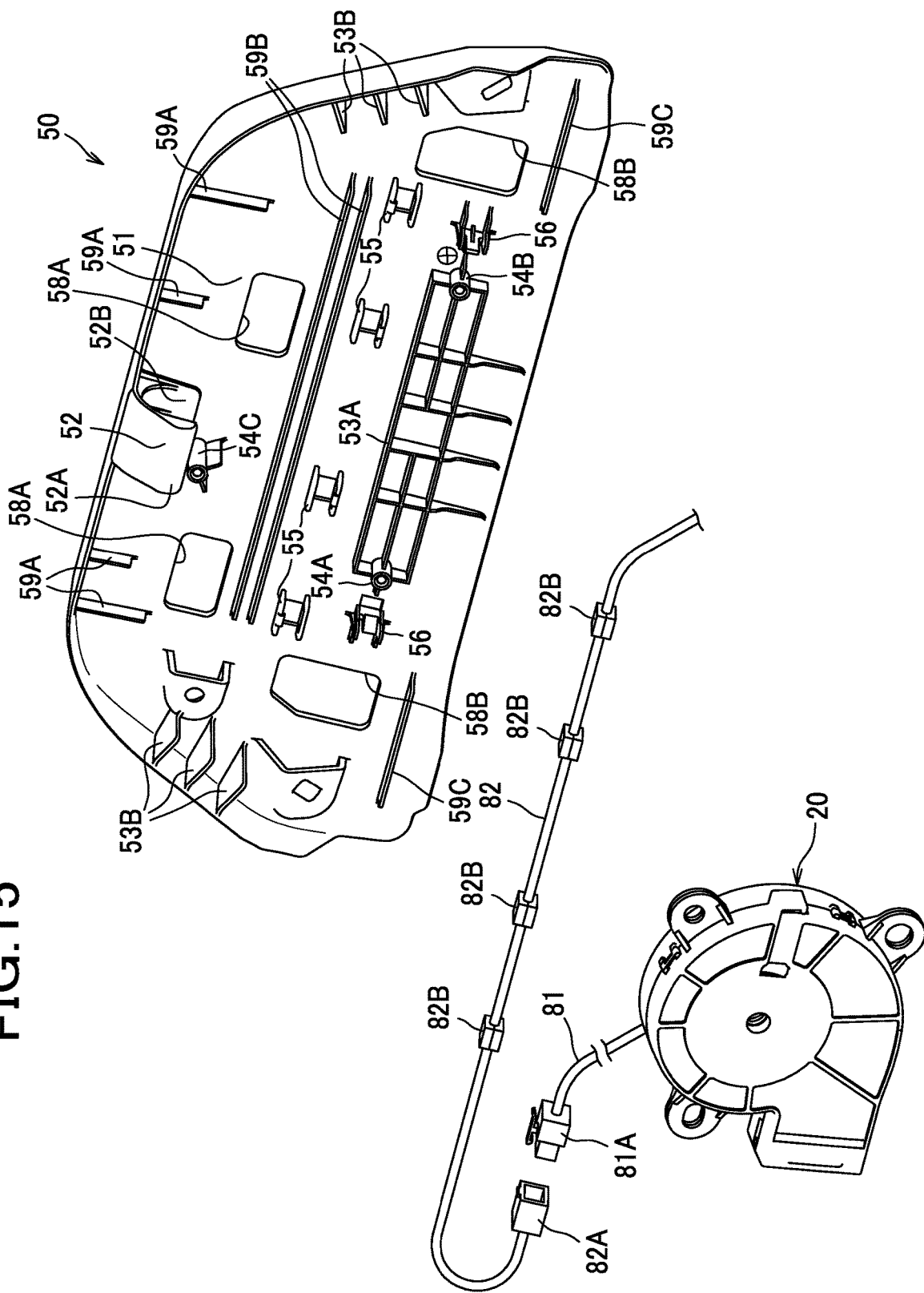
FIG. 15 is a sectional view of a cover member according to a modified embodiment.

For example, as seen in FIG. 15, the cover member 50 has two openings 58A on right and left sides of the boss 54C, and two openings 58B at positions outside of the hooks 56.

Further, to compensate for the decrease in rigidity of the cover member 50 due to formation of the openings 58A, the main body portion 51 includes four reinforcement ribs 59A provided on right and left sides of the locking claw portion 52 at positions above and outside of the two openings 58A, and a pair of upper and lower reinforcement ribs 59B provided between the two openings 58A and the engagement portions 55. The reinforcement ribs 59A extend in the upper-lower direction, and the reinforcement ribs 59B extend in the lateral direction. Similarly, to compensate for the decrease in rigidity of the cover member 50 due to formation of the openings 58B, the main body portion 51 includes reinforcement ribs 59C provided below the openings 58B and extending in the lateral direction.

In the above-described embodiment, the air conditioner provided in the seat back has been described. However, the air conditioner may be provided in the seat cushion. In this configuration, the blower and the bracket may be fixed to the seat frame as with those fixed to the seat back in the above-describe embodiment. The same can be applied to the structure for fixing the duct to the bracket and the blower.

In the above-described embodiment, the air conditioner is configured such that the blower draws air in from the surface of the seat back through the duct. However, the present invention is applicable to an air conditioner in which the blower blows air out from the surface of the seat back through the duct. In this configuration, the flat surface portion may be provided around an outlet of air, and the flange of the duct is contacted with the flat surface portion to connect the duct to the blower with the flange being held between the bracket and the fan.

In the above-described embodiment, the bracket 40 is fixed to the cover member 50 with the tapping bolts 91, and the blower 20 is fixed to the bracket 40 with the tapping bolts 92. However, simple plug-in clips may be used in place of the tapping bolts 91, 92. As an alternative, the bracket 40 may be fixed to the cover member 50 by welding bosses provided on one of the bracket 40 and the cover member 50 to the other one of the bracket 40 and the cover member 50.

In the above-described embodiment, the bracket 40 is first fixed to the seat frame F, and thereafter the blower 20 is fixed to the bracket 40. However, the blower 20 may be first fixed to the bracket 40, and then the assembly of the blower 20 and the bracket 40 may be fixed to the seat frame F.

In the above-described embodiment, the bracket 40 is fixed to the bridge frame 15 of the seat back frame F1. However, the bracket 40 may be fixed to a portion of the seat back frame F other than the bridge frame 15.

In the above-described embodiment, a car seat used in an automobile has been illustrated as an example of a vehicle seat. However, the vehicle seat may be any other seat used in other vehicles, such as rail cars, aircraft and ships.

The invention claimed is:

1. A vehicle seat comprising:
a seat back frame constituting a framework of a seat back;
a blower disposed in the seat back;
a bracket to which the blower is fixed;
a cover member provided on a rear side of the seat back frame, and
a duct connected to an inlet or an outlet of the blower,
wherein at least a portion of the cover member faces the blower in a front-rear direction,
wherein the duct has a first opening disposed at one end and a second opening disposed at another end,
wherein the first opening is connected to the inlet of the blower, and the second opening is configured to receive air from an occupant side of the vehicle seat, and
wherein the second opening is located below the first opening.

2. The vehicle seat according to claim 1, wherein the bracket has a through-hole formed in an area facing the duct.

3. The vehicle seat according to claim 1, wherein
the seat back frame comprises a pair of side frames laterally spaced apart from each other, and an upper frame connecting upper end portions of the side frames, and
the bracket faces the upper frame in an upper-lower direction.

4. The vehicle seat according to claim 1, wherein
the first opening and the second opening are open in a same direction.

5. The vehicle seat according to claim 1, wherein
a flange is formed around the second opening.

6. The vehicle seat according to claim 1, wherein
the duct includes an end portion on a second-opening side of the duct, the end portion being located further laterally inward as the end portion extends toward the second opening.

7. The vehicle seat according to claim 1, wherein
the cover member is held on the seat back frame,
a rib is formed on a surface of the cover member facing the blower, the rib extending in an upper-lower direction, and
the rib is formed between fixing points at which the cover member is fixed to the seat back frame.

8. The vehicle seat according to claim 1, wherein the cover member has a cup-shaped configuration that opens frontward.

9. The vehicle seat according to claim 8, wherein
the cover member includes right and left flanges and upper and lower flanges, and
the lower flange includes a lateral central portion and lateral end portions, the lateral end portions extending further frontward than the lateral central portion.

10. A method of manufacturing a vehicle seat, the method comprising:
providing a seat back frame constituting a framework of a seat back;
providing a bracket with a duct attached thereto, wherein the duct includes:
a first opening disposed at one end, and
a second opening disposed at another end, the second opening being configured to receive air from an occupant side of the vehicle seat, and the second opening being located below the first opening;
placing a cover member on a rear side of the seat back frame;
fixing a blower to the bracket in such a manner that an inlet or an outlet of the blower is connected to the first opening of the duct; and
locating the blower in the seat back in such a manner that at least a portion of the blower faces the cover member in a front-rear direction.

11. A vehicle seat comprising:
a seat back frame constituting a framework of a seat back;
a blower disposed in the seat back;
a bracket to which the blower is fixed;
a cover member provided on a rear side of the seat back frame; and
a duct connected to an inlet or an outlet of the blower,
wherein at least a portion of the cover member faces the blower in a front-rear direction,
wherein the duct has a first opening disposed at one end and a second opening disposed at another end,
wherein the first opening is connected to the inlet of the blower, and the second opening is configured to receive air from an occupant side of the vehicle seat, and
wherein a flange is formed around the second opening.

\* \* \* \* \*